US012479295B2

(12) United States Patent
Austin et al.

(10) Patent No.: US 12,479,295 B2
(45) Date of Patent: Nov. 25, 2025

(54) METHODS FOR CONTROLLING VEHICLE SETTINGS AND/OR FUNCTIONS USING STEERING DEVICE FINGER TAPPING

(71) Applicant: Toyota Motor Engineering & Manufacturing North America, Inc., Plano, TX (US)

(72) Inventors: Benjamin Piya Austin, Saline, WI (US); John K. Lenneman, Okemos, MI (US); George M. Evans, Ann Arbor, MI (US); Takeshi Yoshida, Ann Arbor, MI (US); William Patrick Garrett, Plymouth, MI (US); Rebecca L. Kirschweng, Whitmore Lake, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 18/135,950

(22) Filed: Apr. 18, 2023

(65) Prior Publication Data
US 2024/0351595 A1 Oct. 24, 2024

(51) Int. Cl.
*B60K 35/10* (2024.01)
*B60W 40/09* (2012.01)
*B60W 50/08* (2020.01)

(52) U.S. Cl.
CPC ............. *B60K 35/10* (2024.01); *B60W 40/09* (2013.01); *B60W 50/08* (2013.01);
(Continued)

(58) Field of Classification Search
CPC ................ B60W 50/08; B60W 40/09; B60W 2540/221; B60W 2420/403;
(Continued)

(56) References Cited

U.S. PATENT DOCUMENTS

| 8,886,414 B2 | 11/2014 | Entenmann et al. |
| 10,296,101 B2 | 5/2019 | Norieda et al. |
| (Continued) | | |

FOREIGN PATENT DOCUMENTS

| CN | 106199616 A | 12/2016 | |
| CN | 110194208 A | * 9/2019 | ............. B62D 1/046 |
| (Continued) | | | |

OTHER PUBLICATIONS

Liu et al, Ningning, "Active Control for Vehicle Interior Noise Using the Improved Iterative Variable Step-Size and Variable Tap-Length LMS Algorithms." Noise control engineering journal 67.6 (2019): 405-414. Web. (Year: 2019).*

*Primary Examiner* — Russell Frejd
*Assistant Examiner* — Keith A von Volkenburg
(74) *Attorney, Agent, or Firm* — DINSMORE & SHOHL LLP

(57) ABSTRACT

Certain embodiments of the present disclosure provide techniques for controlling settings (and/or functions) of a vehicle via steering device finger tapping. A method generally includes receiving vibration information from a plurality of vibration sensors associated with a steering device, wherein the plurality of vibration sensors are configured to detect vibration on the steering device caused by a user of the vehicle; in response to receiving the vibration information, determining a user command based on the vibration information, determining a probability that the user intends to employ the user command via the vibration caused by the user, determining whether the probability is equal to or above a threshold, and selectively transmitting or not transmitting, to a controllable device, a control command corresponding to the user command based on whether the probability is determined to be equal to or above the threshold.

20 Claims, 4 Drawing Sheets

(52) U.S. Cl.
CPC .. *B60K 2360/148* (2024.01); *B60W 2420/403* (2013.01); *B60W 2420/54* (2013.01); *B60W 2540/221* (2020.02)

(58) Field of Classification Search
CPC ............... B60W 2420/54; B60K 35/00; B60K 2360/148; B60K 35/10
USPC .......................................................... 701/36
See application file for complete search history.

(56) References Cited

U.S. PATENT DOCUMENTS

| | | |
|---|---|---|
| 10,719,218 B2 | 7/2020 | Jubner et al. |
| 11,900,911 B2 * | 2/2024 | Bastyr ............... G10K 11/17875 |
| 2006/0259205 A1 | 11/2006 | Krum |
| 2012/0191267 A1 | 7/2012 | Ogawa et al. |
| 2015/0312404 A1 * | 10/2015 | Abramson ............... H04W 8/02 455/418 |
| 2020/0233573 A1 * | 7/2020 | De Camargo Barscevicius .......... H04N 21/47217 |
| 2020/0247425 A1 * | 8/2020 | Chou ................ B60W 50/0098 |
| 2021/0031778 A1 * | 2/2021 | Farooq .................... G06F 21/32 |
| 2022/0076070 A1 * | 3/2022 | Leidich .................. G06N 20/00 |
| 2022/0248312 A1 * | 8/2022 | Bai ........................ G06N 20/20 |

FOREIGN PATENT DOCUMENTS

| | | | | |
|---|---|---|---|---|
| JP | 2007203983 A | * | 8/2007 | |
| WO | WO-2019099079 A1 | * | 5/2019 | ............ G06N 20/00 |
| WO | WO-2022144839 A1 | * | 7/2022 | ............ B60W 50/14 |

* cited by examiner

METHODS FOR CONTROLLING VEHICLE SETTINGS AND/OR FUNCTIONS USING STEERING DEVICE FINGER TAPPING

INTRODUCTION

The present specification generally relates to steering device controls.

BACKGROUND

Over the past few years, increasingly more functions have been migrating from their traditional positions on a console and/or a dashboard of a vehicle onto a steering device, such as a steering wheel. For example, radio controls, climate controls, cruise control operations, and/or the like have been integrated into steering device technology. These steering devices, including such controls (referred to herein as "multi-function steering devices"), help to improve driving safety by strategically placing such controls at the driver's fingertips. In particular, anything that causes the driver to take their eyes off of the road and/or their hands off the steering device, including adjusting vehicle settings, tending to navigation systems, and/or the like, may increase the likelihood of a motor vehicle crash. As such, by having controls deployed at the driver's fingertips, the driver of the vehicle is able to control vehicle settings while still focusing on the primary driving task at hand, thereby increasing automobile safety for everyone in and/or around the vehicle.

It should be noted that the information included in the Background section herein is simply meant to provide a reference for the discussion of certain embodiments in the Detailed Description. None of the information included in this Background should be considered as an admission of prior art.

SUMMARY

Certain embodiments provide a method for controlling settings of a vehicle via steering device finger tapping. The method generally includes receiving vibration information from a plurality of vibration associated with a steering device, wherein the plurality of vibration sensors are configured to detect vibration on the steering device caused by a user of the vehicle. In response to receiving the vibration information, the method generally includes determining a user command based on the vibration information. The method generally includes determining a probability that the user intends to employ the user command via the vibration caused by the user and determining whether the probability is equal to or above a threshold. Further, the method generally includes selectively transmitting or not transmitting, to a controllable device, a control command corresponding to the user command based on whether the probability is determined to be equal to or above the threshold.

Other embodiments provide processing systems configured to perform the aforementioned method as well as those described herein; non-transitory, computer-readable media comprising instructions that, when executed by one or more processors of a processing system, cause the processing system to perform the aforementioned method as well as those described herein; a computer program product embodied on a computer readable storage medium comprising code for performing the aforementioned method as well as those further described herein; and a processing system comprising means for performing the aforementioned method as well as those further described herein.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
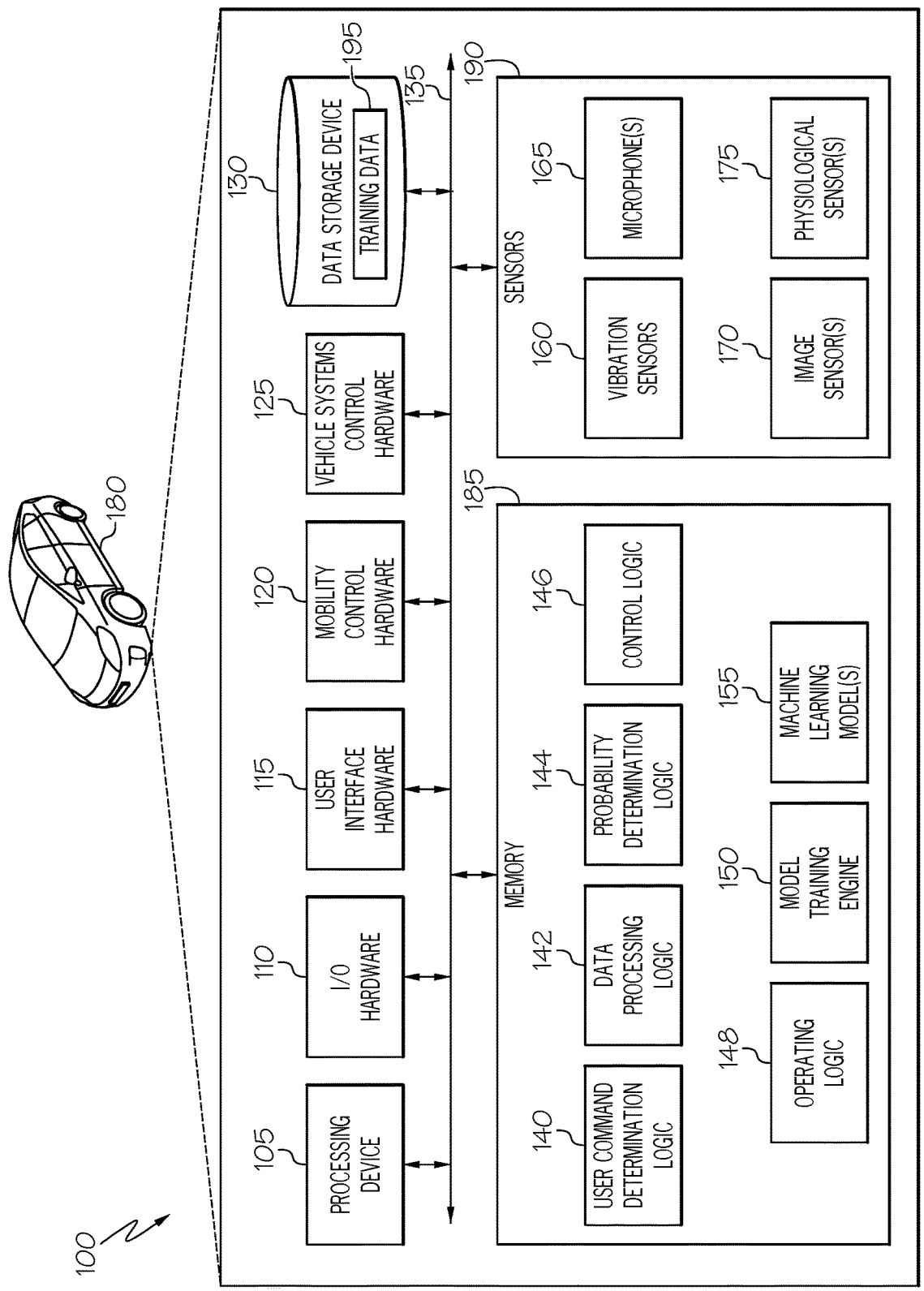
FIG. 1 schematically depicts illustrative hardware components of an illustrative driving support system of a vehicle, according to one or more embodiments shown and described herein.

One steering device design which allows for vehicle control includes a steering device configured to detect tapping by a user on a surface of the steering device for purposes of controlling vehicle settings and/or functions. By tapping a particular section of the steering device, a user may control a particular setting (e.g., control the vehicle's radio volume) or a particular function (e.g., enable or disable cruise control) of the vehicle.

Tapping of fingers on a surface of a steering device, however, may not always indicate a desire of a driver of the vehicle to control vehicle settings and/or functions. Instead, for example, the driver may be subconsciously tapping their fingers to music, the driver may be tapping their fingers as a result of being bored or impatient, and/or the driver may be tapping their fingers to help them think. In other words, sometimes the driver may tap the steering device without volitionally intending to provide control commands to the vehicle. As such, manipulating one or more settings and/or functions of the vehicle each time finger tapping is detected on the steering device may contribute to a poor user experience. For example, increasing a volume of the radio in response to detected finger tapping may disturb a driver that is trying to concentrate on the road and thus desires minimal background noise in the vehicle. As another example, activating a navigation system in the vehicle in response to detecting finger tapping may be an annoyance to a driver of the vehicle who does not desire to use the navigation system and thus has to deactivate the navigation system each time the system is triggered. Further, requiring a driver to perform such deactivation may cause the driver to remove their eyes from the road and/or hands from the steering device while operating a vehicle, thereby increasing the risk of a motor vehicle accident.

As such, embodiments described herein provide methods, apparatuses, processing systems, and computer-readable mediums that discern whether detected steering device finger tapping, caused by a user of a vehicle, is intended to control one or more settings and/or functions of the vehicle. For example, embodiments described herein use data associated with the user and/or collected from one or more sensors within the vehicle to differentiate volitional tapping caused by the user to manipulate vehicle settings and/or functions from other detected tapping.

As used herein, settings may refer to a software program and/or hardware device that may be adjusted to a driver's preference including, for example, the vehicle's radio volume, the vehicle's audio source, the vehicle's temperature, and/or the like. Further, as used herein, functions may refer to a software program and/or hardware device that may be activated or deactivated including, for example, a navigation system, cruise control functionality, autonomous driving functionality, and/or the like.

In certain embodiments, the one or more sensors include at least one microphone that is configured to capture audio from within the vehicle. In certain embodiments, the one or more sensors include at least one image sensor positioned within the vehicle that is configured to capture a position and/or bend of one or more fingers of the driver of the vehicle. In certain embodiments, the one or more sensors include at least one physiological sensor positioned within the sensor and configured to collect physiological data of the driver. In certain embodiments, data for the driver is collected over time to learn behaviours and/or patterns of the driver. As described in detail below, the audio captured by the microphone(s), the finger image data captured by the image sensor(s), the physiological data captured by the physiological sensors(s), and/or learned behaviors and/or patterns for the driver may be analyzed to make a judgment regarding the driver's intent (e.g., with respect to controlling vehicle settings and/or functions). In certain embodiments, a trained machine learning model may be used to make this judgement.

Although embodiments herein are described in the context of driver support systems for automotive vehicles, embodiments are not limited thereto. For example, the driver support systems described herein may be configured and compatible for use with various transportation systems having steering devices, including, for example, motorcycles, bicycles, watercrafts, aircrafts, and/or the like. Other uses should generally be understood and are included within the scope of the present disclosure.

FIG. 1 schematically depicts a non-limiting example of an illustrative driver support system 100. In particular, FIG. 1 schematically depicts illustrative hardware components of the driver support system 100 that may be used to provide a functionality of the driver support system 100 described in further detail herein. Generally, the illustrative driver support system 100 depicted in FIG. 1 is positioned within a vehicle 180 and provides particular use in assisting users (e.g., drivers and/or other occupants) of the vehicle 180 in controlling the vehicle 180 and/or various vehicle systems of vehicle 180. However, it should be appreciated that driver support system 100 is not limited to this use and may be used for other purposes without departing from the scope of the present disclosure.

The example driver support system 100 generally includes a non-transitory computer-readable medium containing one or more programming instructions for completing the various processes described herein, which may be embodied as hardware, software, and/or firmware, according to embodiments shown and described herein. While in some embodiments the various components of driver support system 100 may be configured as a general purpose computer with the requisite hardware, software, and/or firmware, in other embodiments, the various components of the driver support system 100 may also be configured as a special purpose computer designed specifically for performing the functionality described herein.

Driver support system 100 may include a processing device 105, input/output (I/O) hardware 110, user interface hardware 115, mobility control hardware 120, vehicle systems control hardware 125, a data storage device 130, memory 185, and one or more sensors 190. A local interface 135, such as a bus or the like, may interconnect the various components of driver support system 100.

The processing device 105, such as a computer processing unit (CPU), may be the central processing unit of driver support system 100, performing calculations and logic operations to execute a program. Processing device 105, alone or in conjunction with the other components, comprises one or more processing devices, one or more computing devices, and/or one or more processors. Processing device 105 may include any processing component configured to receive and execute instructions (such as from data storage device 130 and/or memory 185).

I/O hardware 110 may communicate information between the local interface 135 and one or more other components of driver support system 100. For example, I/O hardware 110 may act as an interface between the various components described with respect to FIG. 1 and other components of driver support system 100 and/or vehicle 180, such as user interface hardware 115 that controls information communicated to a user of vehicle 180, mobility control hardware 120 that controls movement and/or steering of the vehicle 180, vehicle systems control hardware 125 that controls operations of various vehicle systems within vehicle 180, and/or the like. I/O hardware 110 may be utilized to communicate (e.g., receive and transmit) one or more commands to the other components of driver support system 100 in certain embodiments.

User interface hardware 115 may include any device, mechanism, system, interactive display, and/or various other hardware components for communicating information from driver support system 100 to a user of vehicle 180. For example, user interface hardware 115 may include input hardware, such as a touch screen, button, microphone, and/or other device for receiving inputs from the user. User interface hardware 115 may further include display hardware, such as, for example, a monitor, a video card, a heads-up display, a dashboard display, a mirror display, and/or other another device for sending and/or presenting visual data to the user.

Mobility control hardware 120 may comprise one or more hardware components for controlling a movement, power, functionality, or operation of various components of the vehicle 180 that influence a movement and/or steering of vehicle 180. For example, mobility control hardware 120 may include a steering device (e.g., such as steering device 200 illustrated in FIG. 2 which represents a steering wheel), gas pedal, brake pedal, devices, and/or the like for controlling a movement, steering, acceleration, and/or deceleration of vehicle 180. Such hardware components may generally be configured to generate and transmit one or more signals to one or more motors coupled to vehicle 180 to effect movement of vehicle 180.

Vehicle systems control hardware 125 may comprise one or more hardware components for controlling an actuation, functionality, setting, and/or operation of various controllable vehicle systems and devices of vehicle 180. The vehicle systems and devices controlled by vehicle system control hardware 125 may include, for example, an audio system, a navigation system or global positioning system (GPS), a heating, ventilation and air conditioning (HVAC) system, and/or a mobile communicating system. Further, the vehicle systems control hardware 125 may control a position and/or height of a seat within vehicle 180, a window of vehicle 180, windshield wipers of vehicle 180, headlights of vehicle 180, gear shifting of vehicle 180, and/or the like.

Data storage device 130, which may generally be a storage medium, may contain one or more data repositories for storing data that is received and/or generated by driver support system 100. Data storage device 130 may be any physical storage medium, including, but not limited to, a hard disk drive (HDD), solid-state memory, removable storage, and/or the like. While data storage device 130 is illustrated as a local device to driver support system 100, in certain other embodiments, data storage device 130 is a remote storage device, such as, for example, a server computing device, cloud-based storage device, and/or the like.

In certain embodiments, data storage device 130 includes training data 195. Training data 195 may be used as inputs to an input layer of machine learning model(s) 155, stored in memory 185, and may be labeled so as to test the performance of model(s) 155. In machine learning, data labeling is the process of adding one or more meaningful and informative labels to data to provide context to the data such that a machine learning model can learn from these labels. For example, if one machine learning model 155 is a model trained to determine whether a user operating a vehicle intends to control vehicle settings and/or functions via steering device finger tapping, then training data 195 may include data describing the user and/or vehicle when the finger tapping is detected as training inputs and labels indicating (1) that the user intended to control vehicle settings and/or functions or (2) that the user did not intend to control vehicle settings and/or functions. Training data 195 may include historical data for a plurality of users, historical data for a plurality of users of vehicle 180, and/or historical data for a single user of vehicle 180. Training data 195 may be continuously and/or periodically collected over time and stored in data storage device 130.

In certain embodiments, training data 195 includes training data for a plurality of users and/or vehicles. For example, vehicles described herein may be configured to engage in vehicle-to-vehicle (V2V) communications with one or more other vehicles. V2V communication enables vehicles to wirelessly communicate and/or exchange information with other vehicles in proximity to the vehicle. As such, a vehicles, equipped for such communication, may share training data 195 collected for a plurality of users to create a larger pool of training data 195 that may be used for training machine learning model(s) 155. Further, in certain embodiments, vehicles may be configured to engage in vehicle-to-infrastructure (V2I) communications to further increase the pool of training data 195 used to train machine learning model(s) 155.

The one or more sensors 190 may generally include the various sensors described herein, including, for example, one or more vibration sensors 160, one or more microphones 165, one or more image sensors 170, and/or one or more physiological sensors 175.

The one or more microphones 165 may be configured to detect audio content rendered by at least the audio system of vehicle 180. In certain embodiments, the audio content detected by the one or more microphones 165 comprises music content.

The one or more image sensors 170 may include, but are not limited to, LiDAR sensors, RADAR sensors, and/or optical sensors (e.g., cameras, laser sensors). The one or more image sensors 170 may be configured to produce, at least, image data capturing a posture of one or both hands and/or one or more fingers of a user operating the vehicle. In certain embodiments, the image data may capture a position of each of the one or more fingers in relation to each finger captured. In certain embodiments, the image data may capture a bend (e.g., arch) of each of the one or more fingers in relation to each finger captured.

Further, in certain embodiments, the one or more image sensors 170 may be configured to produce image data capturing head movement of the user. In some cases, the captured head movement indicates shaking and/or bouncing of the user's head. Additionally, in certain embodiments, the one or more image sensors 170 may be configured to produce image data capturing mouth movement of the user. In some cases, the captured mouth movement may indicate that the user is mouthing the lyrics of a song currently playing within vehicle 180.

The one or more physiological sensors 175 may be configured to measure physiological signal data for a user operating vehicle 180 and generate one or more signals and/or data to transmit to processing device 105 for processing. In certain embodiments, the one or more physiological sensors 175 include neuroimaging sensors capable of detecting brainwave signals of a user of vehicle 180. The neuroimaging sensors may include magnetoencephalography (MEG), near-infrared spectroscopy (NIRS) and/or electroencephalogram (EEG) sensors that are capable of detecting the brainwave signals of the user, in a non-invasive manner. In certain embodiments, the neuroimaging sensors are capable of detecting brainwave signals of the user without requiring direct physical contact between the sensors and a head of the user. It should be understood that the one or more neuroimaging sensors may comprise various other non-invasive, contactless sensors that are configured to detect brainwave signals without requiring physical contact, connection, or engagement with the subject being monitored. In certain embodiments, the neuroimaging sensors receive brainwave signal data and generate one or more signals and/or data to transmit to processing device 105 for processing the data and generating a brainwave map of the user.

In certain embodiments, physiological signals and/or data (e.g., brainwave signals and/or data) transmitted to processing device 105 are used (e.g., analyzed and/or processed) by processing device 105 to determine a level of activity of a prefrontal cortex of a user of vehicle 180. The prefrontal cortex is a region of the cerebral cortex involved in executive function including planning, judgment, decision-making, and controlling and execution of voluntary movements. The prefrontal cortex is an area of the frontal lobe located anterior to the central sulcus in the human brain.

In certain embodiments, physiological signals and/or data (e.g., brainwave signals and/or data) transmitted to processing device 105 are used by processing device 105 to determine a level of listening activity within an auditory cortex of a user of vehicle 180 and determine a level of processing activity within the auditory cortex of the user. The auditory cortex of the human brain is responsible for receiving and processing the contents of audio, such as sounds, voices, and/or music.

In certain embodiments, physiological signals and/or data (e.g., brainwave signals and/or data) transmitted to processing device 105 are used (e.g., analyzed and/or processed) by processing device 105 to determine a level of activity of a motor cortex of a user of vehicle 180. The primary function of the motor cortex is to generate signals to direct the movement of the body. As such, motor cortex activity may be present in physiological sensor data when a user moves one or more of their fingers. As described in detail below, motor cortex activity may be useful for determining whether vibration detected via vibration sensors 160 is caused by volitional movement of the user and/or some other factor.

Figure 2:
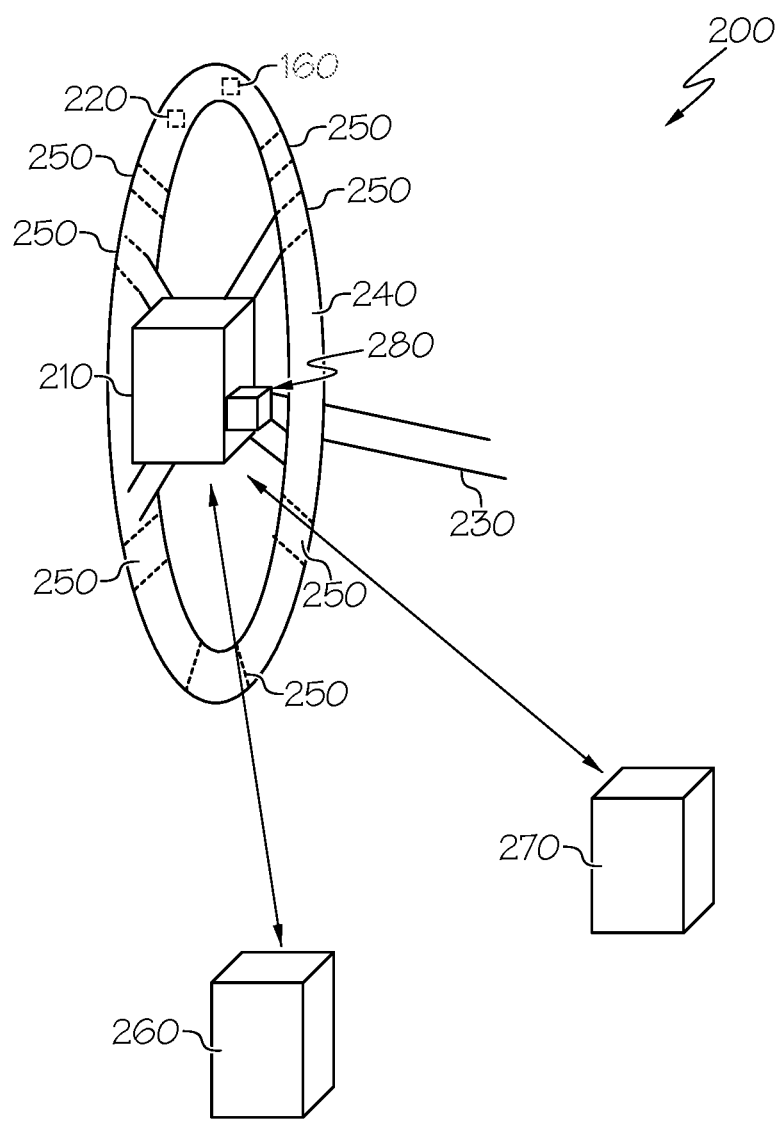
FIG. 2 schematically depicts an illustrative multi-function steering device having a plurality of vibration sensors configured to detect vibration on the steering device, according to one or more embodiments shown and described herein.

The one or more vibration sensors 160 may be piezoelectric sensors and/or microphones. The one or more vibration sensors 160 may be associated with a steering device of vehicle 180 and configured to detect vibration on the steering device. In certain embodiments, the vibration sensors 160 are mounted to an outside surface of the steering device. The vibration sensors 160 may be fixed permanently or detachably mounted. For example, FIG. 2 schematically depicts an illustrative steering device 200 having a plurality of vibration sensors 160 mounted thereon and configured to detect vibration on steering device 200, according to one or more embodiments shown and described herein. Steering device 200 may be a multi-function steering device.

Steering device 200 includes a device 240, a steering shaft or steering column 230, a controller 210, and two or more vibration sensors 160. Vibration sensors 160 are mounted to device 240 that is coupled to steering shaft or steering column 230. Controller 210 is drawn onto a hub of device 240 for sake of simplicity only. In particular, generally the hub region is reserved for an airbag, for example, and controller 210 is rather located in or behind the hub of device 240.

Vibration sensors 160 may be fixed to a rim of when 240. Vibration sensors 160 may be positioned such that vibration from each different section 250 of device 240 produces a unique combination of vibration information produced by vibration sensors 160. Each unique combination of the vibration information produced from vibration at each different section 250 device 240 may correspond to a unique user command.

Sections 250 of device 240 may refer to sections of the rim of the device 240. In certain embodiments, sections 250 may also include the spokes and/or other intermediary elements used to connect device 240 to steering shaft 230.

Vibration sensors 160 may be communicatively connected to controller 210 via wired connections. Controller 210 and/or vibration sensors 160 may be configured to detect vibration that exceeds a given threshold. Controller 210 may be configured to determine tapping device 240 and a section 250 based on a time difference of arrival of vibration as measured by different vibration sensors 160 located on device 240. The time difference may be measured from detected up and/or down ramps in the vibration information produced by different vibration sensors 160. Alternatively, controller 210 may be configured to compare outputs of different vibration sensors 160 in a frequency domain.

In certain embodiments, steering device 200 further comprises an orientation detector 280 configured to detect an orientation of steering device 200 in relation to vehicle 180, in which steering device 200 is mounted. In certain embodiments, orientation detector 280 includes an angle sensor configured to detect a turning angle of steering device 200 with respect to steering column 230's non-rotating body. In certain embodiments, orientation detector 280 is configured to receive, from an auxiliary system, an indication of the orientation of steering device 200. In certain embodiments, the orientation of steering device 200 detected (or determined) by orientation detector 280 may be used as input when determining whether a user intends to control vehicle settings and/or functions, in response to detecting vibration of steering device 200 caused by the user, as described in detail below.

In certain embodiments, devices that may be controlled via finger tapping on device 240 include two example auxiliary control units 260 and 270, which represent various possible devices and/or systems that may be controlled by controller 210. For example, these auxiliary control units 260, 270 may be vehicle system control hardware 125 that is configured for controlling an actuation, functionality, setting, and/or operation of various vehicle systems (e.g., an audio system, a navigation system, etc.) of vehicle 180, as described above.

Referring back to FIG. 1, although sensors 190 in vehicle 180 are described with respect to collecting sensor data for a single user operating vehicle 180 (e.g., image data for the driver of vehicle 180, physiological data for the drive of vehicle 180, etc.), in certain other embodiments, such sensors 190 may be used to collect data for a plurality of users within vehicle 180. For example, image sensors 170 may be used to capture image data for multiple users within vehicle 180. The image data may indicate that the multiple users in vehicle 180, for which the data is collected, are moving their heads. Head movement detected for all users in vehicle 180 may provide insight into any vibration detected on a steering device of vehicle 180. In particular, head movement by all users within vehicle 180 may indicate that the users are moving along to a song playing in vehicle 180, and as such, any vibration detected on a steering device of vehicle 180 while this head movements is detected is likely not intended by the user operating vehicle 180 to control settings and/or functions of vehicle 180.

Figure 3:
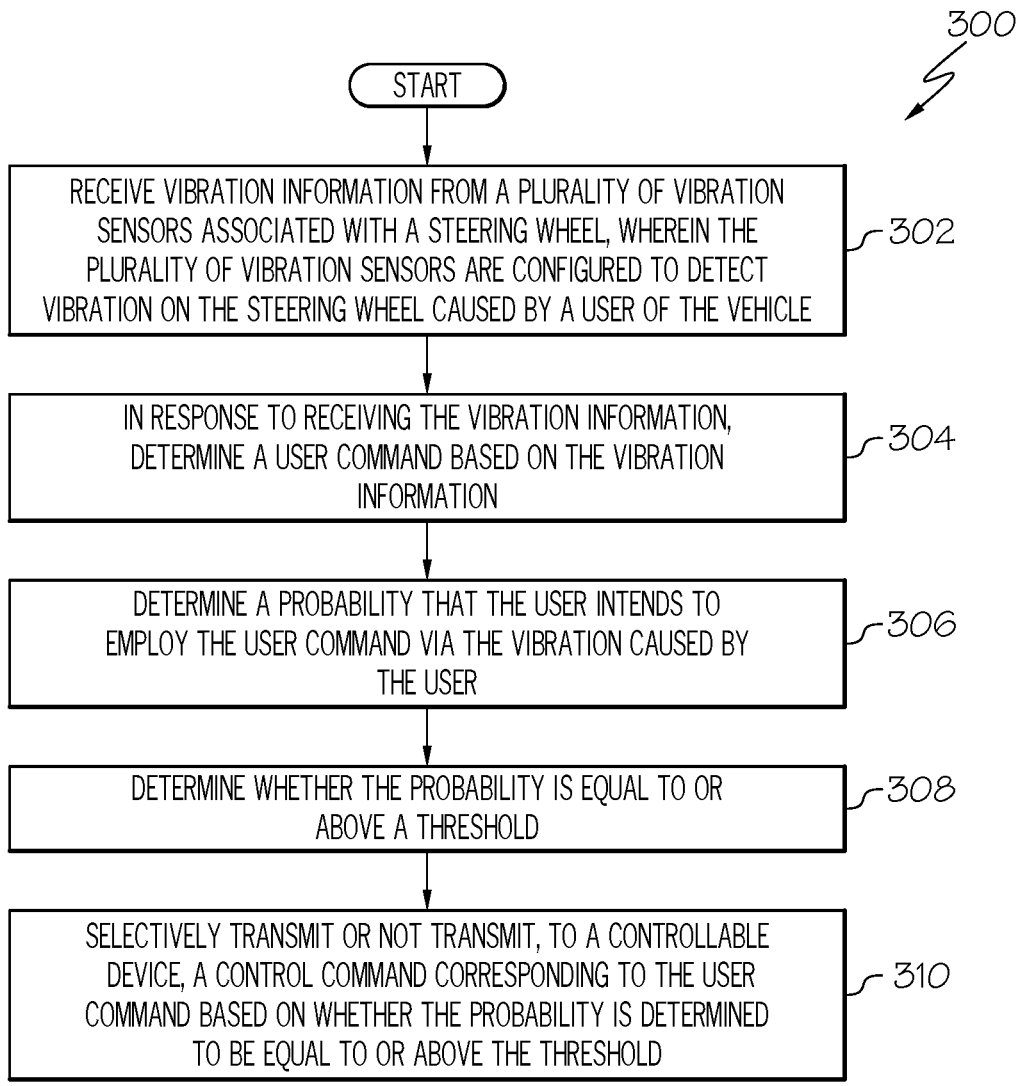
FIG. 3 depicts a flow diagram illustrating example operations for controlling settings of a vehicle with the driving support system of FIG. 1, according to one or more embodiments shown and described herein.
Figure 4:
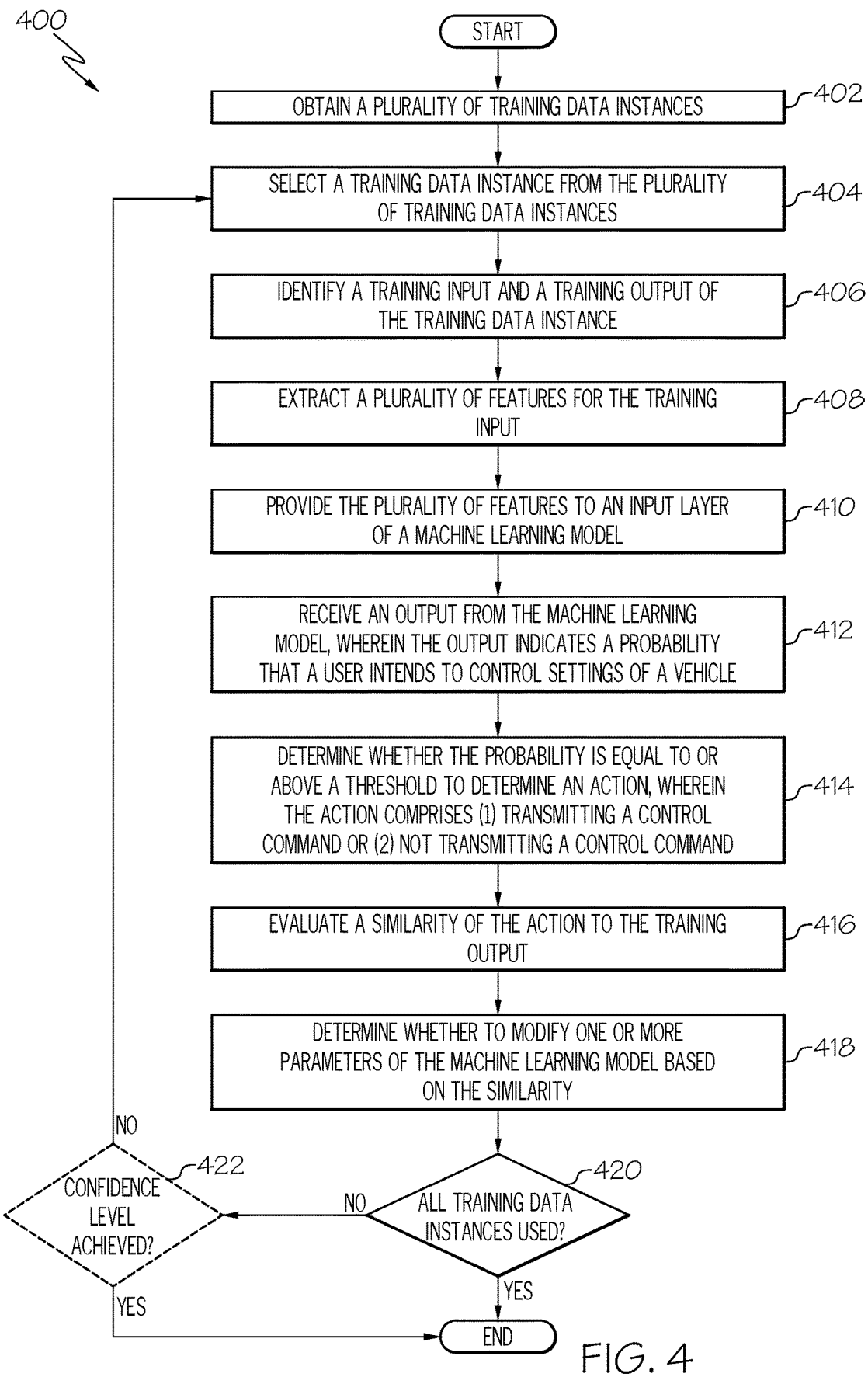
FIG. 4 depicts a flow diagram illustrating example operations for training a machine learning model to predict a driver's intent with respect to controlling vehicle settings and/or functions, according to one or more embodiments shown and described herein.

Memory 185 may be configured as a volatile and/or a nonvolatile computer-readable medium and, as such, may include one or more programming instructions thereon that, when executed by processing device 105, cause processing device 105 to complete various processes, such as the processes described herein with respect to FIGS. 3 and 4. The programming instructions stored on memory 185 may be embodied as a plurality of software logic modules, where each logic module provides programming instructions for completing one or more tasks.

For example, FIG. 1 schematically depicts memory 185 containing illustrative logic components according to one or more embodiments shown and described herein. Memory 185 may be configured to store various processing logic, such as, for example, user command determination logic 140, data processing logic 142, probability determination logic 144, control logic 146, and operating logic 148 (each of which may be embodied as a computer program, firmware, or hardware, as an example).

User command determination logic 140 may include one or more programming instructions for determining a user command based on vibration information received from vibration sensor(s) 160.

Data processing logic 142 may include one or more programming instructions for processing, by processing device 105, signals and/or data received from sensors 190. In certain embodiments, data processing logic 142 includes programming instructions for determining a beat of audio content received from one or more microphone 165 and determining a rhythm of vibration information received from one or more vibration sensors 160. Further, data processing logic 142 includes programming instructions for determining a percentage of temporal alignment between the determined beat of the audio content and the determined rhythm of the vibration information.

In certain embodiments, data processing logic 142 includes programming instructions for determining a beat of audio content received from one or more microphone 165 and processing image data received from one or more image sensors 170 to determine a speed and/or pattern of head movement of a user (and/or other passengers within the vehicle). Further, data processing logic 142 includes programming instructions for determining an alignment between the determined beat of the audio content and the determined head movement speed and/or pattern.

In certain embodiments, data processing logic 142 includes programming instructions for processing image data received from one or more image sensors 170 to determine a posture of one or more fingers a user of vehicle 180. Determining the posture may include determining a position (including orientation) and/or determining a bend (e.g., arch) of each of the one or more fingers captured in the image data.

In certain embodiments, data processing logic 142 includes programming instructions for processing physiological signals and/or data received from one or more physiological sensors 175 to determine a level of activity of a prefrontal cortex of a user of vehicle 180. In certain embodiments, data processing logic 142 includes programming instructions for processing physiological signals and/or data received from one or more physiological sensors 175 to determine a level of activity of a motor cortex of a user of vehicle 180. In certain embodiments, data processing logic 142 includes programming instructions for processing physiological signals and/or data received from one or more physiological sensors 175 to determine a level of listening activity and/or processing activity within an auditory cortex of a user of vehicle 180.

Probability determination logic 144 may include one or more programming instructions for determining (or calculating) a probability that a user of vehicle 180 (e.g., driver operating a steering device of vehicle 180) intends to employ a user command via vibration caused by the user (e.g., on a steering device of vehicle 180). As described in detail below, probability determination logic 144 may assess one or more factors when making this determination. Further, probability determination logic 144 may include one or more programming instructions for determining whether the probability is equal to or above a threshold. The threshold may be a predetermined percentage. The threshold may be user-specific.

Control logic 146 may include one or more programming instructions for determining whether a control command is to be transmitted to a controllable device or controllable system of vehicle systems control hardware 125. Transmission of a control command may be used to control an actuation, functionality, setting, and/or operation of various controllable vehicle systems and devices of vehicle 180.

Operating logic 148 may include an operating system and/or other software for managing components of driver support system 100.

Model training engine 150 performs operations related to training machine learning model(s) 155, such as operations 400 of FIG. 4, described below. In certain embodiments, model training engine 150 runs on an onsite computing device. In certain embodiments, model training engine 150 receives training data 195 from data storage device 130, and uses training data 195 and to train machine learning model(s) 155.

Machine learning model(s) 155 are models that have been trained to find patterns within new data and make predictions. Machine learning model(s) 155 may be represented as a mathematical function that takes requests in the form of input data, makes predictions on the input data, and then provides an output in response. In certain embodiments, machine learning model(s) 155 include at least a first model trained according to a classifier algorithm to predict whether a user of vehicle 180 intends to employ a user command via vibration, caused by the user, with the steering device of vehicle 180. A classifier algorithm in machine learning is an algorithm that automatically orders or categorizes data into one or more of a set of "classes." In this case, the classifier may scan input data to filter it into one of two "classes": (1) the user intends to control vehicle settings and/or function via finger tapping or (2) the user does not intend to control vehicle settings and/or functions via finger tapping.

FIG. 3 depicts a flow diagram illustrating example operations 300 for controlling settings of a vehicle via driver support system 100 of FIG. 1, according to one or more embodiments shown and described herein. More specifically, operations 300 may be used to determine whether detected steering device finger tapping, caused by a user of vehicle 180, is intended to control one or more settings and/or functions of vehicle 180. As such, operations 300 may be used to differentiate between volitional tapping caused by the user to manipulate vehicle systems control hardware 125 and other detected tapping (e.g., subconscious tapping of user's fingers). Operations 300 may be performed by components illustrated in FIG. 1. In addition, operations 300 may generally be completed when vehicle 180 is in active operation by a user. The various operations described with respect to FIG. 3 are merely illustrative, and additional, fewer, or alternative steps are contemplated without departing from the scope of the present disclosure.

Operations 300 being, at operation 302, with receiving vibration information from a plurality of vibration sensors 160 associated with a steering device of vehicle 180. The vibration information may be received by processing device 105 of driver support system 100. The steering device may be steering device 200, having a plurality of vibration sensors 160 mounted on an outside surface (e.g. rim) of the steering device, as illustrated in FIG. 2. As previously described, the plurality of vibration sensors 160 may be configured to detect vibration on the steering device caused by a user (e.g., driver) of vehicle 180. Although embodiments herein are described with respect to vibration being caused by a driver of vehicle 180, in certain other embodiments, the vibration on the steering device detected by vibration sensors 160 may be vibration caused may one or more other occupants within vehicle 180 (e.g., that come in contact with the steering device).

In response to receiving the vibration information, operations 300 continue, at operation 304, with determining a user command based on the vibration information. Determining the user command may include determining a unique user command corresponding to the vibration information received from the plurality of vibration sensors.

In particular, in certain embodiments, vibration sensors 160 are positioned along a rim of the steering device such that vibration detected by vibration sensors 160 from each different section 250 of the steering device produces a unique combination of vibration information produced by vibration sensors 160. Each unique combination of the vibration information produced from vibration at each different section 250 may correspond to a unique user command. For example, vibration detected at a first section 250 (e.g., top) of the steering device may correspond to a fast forward command (e.g., a user command used to advance or jump ahead when an audio file is being played via an audio system of vehicle 180), while vibration at a second section 250 (e.g., bottom) of steering device may correspond to a rewind command. Thus, based on a section 250 where the vibration is detected, a unique combination of vibration information may be produced, and this unique combination of vibration information may correspond to a unique user command, that may be determined by driver support system 100.

Further, in certain embodiments, unique patterns of vibration detected by vibration sensors 160 positioned on the rim of the steering device may correspond to unique user commands. For example, vibration sensors 160 may detect a unique pattern of vibration on the steering device, and based on the unique pattern detected produce a unique combination of vibration information. The unique combination of the vibration information produced based on the vibration pattern detected may correspond to a unique user command. Different patterns of vibration that may be caused by a user of the steering device and detected by vibration sensors 160 may include tapping the steering device rim two times in a same location, tapping the steering device rim with a large delay between each tap, tapping the steering device rim quickly and continuously, tapping the steering device rim with one finger, then two fingers, then three fingers, etc., and/or the like.

The user command determined at operation 304 may include, but are not limited to, selecting a next song or a next channel, selecting a previous song or a previous channel, fast forwarding, rewinding, adjusting volume up or down, muting/unmuting, answering/ending a phone call, selecting an audio source, changing temperature up or down, changing air conditioner or heat blowing location, activating or deactivating navigation, selecting a navigation target, displaying current location, turning on a GPS/navigation system to a navigation target, turning on or off spoken feedback, switching on or off traffic announcements, and switching on or off lane assist mechanisms. In certain embodiments, more than one user command may be determined at operation 304.

Operations 300 continue, at operation 306, with determining a probability that the user intends to employ the user command via the vibration caused by the user. As described herein, steering device finger tapping, caused by a user of a vehicle 180, may not always indicate a desire of the user to control vehicle settings and/or functions. Instead, in some cases, the user may tap the steering device without volitionally intending to provide control commands to the vehicle. As such, by determining a probability that the user intends to provide control commands to the vehicle prior to transmitting these control commands to controllable systems and/or devices in vehicle 180, a better user experience may be provided to the user. In particular, only a probability determined to be above a threshold (e.g., indicating that the user desires to control one or more vehicle settings and/or functions of one or more vehicle systems and/or devices) may trigger the transmission of a control command to a corresponding controllable vehicle system and/or device.

In certain embodiments, the probability that the user intends to employ the user command is based on a percentage of temporal alignment between a beat of audio (e.g., music) playing within vehicle 180 and a rhythm of tapping detected by vibration sensors 160. For example, in some cases, a user of vehicle 180 may be subconsciously tapping their fingers to the beat of a song or other audio playing within vehicle 180. As such, the user may not intend to control vehicle settings and/or functions via such finger tapping. Accordingly, in certain embodiments, at least one microphone 165 may be deployed in vehicle 180 to capture audio content rendered by at least the audio system of vehicle 180. The at least one microphone 165 may transmit this information to processing device 105 where it may be processed to determine a beat of the audio content. Further, processing device 105 may determine a rhythm of vibration information received from vibration sensors 160, and compare the beat of the audio content to the rhythm of the vibration information. The comparison may be used to determine a percentage of temporal alignment between the beat of the audio content and the rhythm of the vibration information. The probability that the user intends to employ the user command may be based on this percentage of temporal alignment. For example, there may be a higher probability (e.g., 90%) that a user intends to control vehicle settings and/or function where the beat of the audio is in almost perfect temporal alignment with the rhythm of the vibration (e.g., a high percentage of temporal alignment, such as 95%) as opposed to cases where the beat of the audio is out of sync with the rhythm, of the vibration (e.g., a low percentage of temporal alignment, such as 25%). Different users may have different thresholds of temporal alignment which indicate whether the user intended to control vehicle settings and/or functions, or not. For example, one user may be more musically or rhythmically inclined/talented; thus, a higher percentage of temporal alignment may need to be met before processing device 105 determines that the user intended to control settings and/or functions of vehicle 180, as opposed to a lesser musically inclined user.

In certain embodiments, the probability that the user intends to employ the user command is based on a percentage of alignment between a beat of audio (e.g., music) playing within vehicle 180 and a head speed and/or pattern of the user detected by image sensors 160. For example, in some cases, a user of vehicle 180 may subconsciously move and/or bounce their head to the beat of a song or other audio playing within vehicle 180. Accordingly, in certain embodiments, at least one microphone 165 may be deployed in vehicle 180 to capture audio content rendered by at least the audio system of vehicle 180. The at least one microphone 165 may transmit this information to processing device 105 where it may be processed to determine a beat of the audio content. Further, at least one image sensor 170 may be deployed in vehicle 180 to capture a head movement of the user. The at least one image sensor 170 may transmit this information to processing device 105 where it may be processed to determine a speed and/or pattern of the user's head movement. Processing device 105 may compare the beat of the audio content to the pattern and/or speed of the user's head movement. The comparison may be used to determine a percentage of alignment between the beat of the audio content and the head movement. The probability that the user intends to employ the user command may be based on this percentage of alignment. For example, a greater percentage of alignment may indicate that the user was moving along to the beat of the song. If the user's head was moving it is likely that the user's fingers may also have been moving; thus, any vibration detected on the steering device may not be intended by the user to control vehicle settings and/or functions.

In certain embodiments, the probability that the user intends to employ the user command is based on a percentage of alignment between expected mouth movement for singing lyrics of a particular song playing within vehicle 180 and mouth movement of the user detected by image sensors 160. For example, in some cases, a user of vehicle 180 may be mouthing lyrics of a song playing in the vehicle. Mouthing lyrics to a song playing may indicate that the user is leisurely listening to the song; thus, any tapping of the fingers, while mouthing of the lyrics, may similarly be deemed as leisure tapping not intended to control vehicle settings and/or functions. As such, processing device 105 may take into consideration mouth movement of the user compared to expected mouth movement for a particular song playing when determining whether a user intends to control vehicle settings and/or functions.

In certain embodiments, the probability that the user intends to employ the user command is based on a posture of one or more fingers of the user of vehicle 180, determined by processing device 105 in driver support system 100. For example, in certain embodiments, the posture (e.g., position, orientation, bend, arch, etc.) of one or more fingers of the user may indicate how the user is going to interact with the steering device. More specifically, the posture of the one or more fingers of the user may indicate whether the user is going to interact with the steering device with an intent to control vehicle settings and/or functions or without an intent to control vehicle settings and/or functions (e.g., leisurely, subconsciously, non-volitional tapping). Accordingly, in certain embodiments, at least one image sensor 170 may be deployed in vehicle 180 to produce, at least, image data capturing a posture of one or both hands and/or one or more fingers of a user within vehicle 180. The at least one image sensor 170 may transmit this information to processing device 105 where it may be processed to determine a posture of the one or more fingers of the user. In some cases, processing device 105 may additionally determine a position and/or orientation of one or both of the hands in relation to the steering device within vehicle 180. Further, processing device 105 may predict the probability that the user intends to employ the user command based on the posture of the one or more fingers of the user (and, in some cases, the position and/or orientation of one or both of the hands in relation to the steering device). In certain embodiments, processing device 105 may use a machine learning model 155 to make this prediction. The machine learning model 155 may be a model previously trained to differentiate between (1) first finger postures of the user that are intended to control the settings and/or functions of the vehicle and (2) second finger postures of the user that are not intended to control the settings and/or functions of the vehicle.

In certain embodiments, the probability that the user intends to employ the user command is based on prefrontal cortex activity of the user of vehicle 180. As described above, the prefrontal cortex is a region of the cerebral cortex involved in planning, controlling and execution of voluntary movements. In other words, signals may be sent from the prefrontal cortex to the motor cortex to control movement of one or more parts of the body, including moving a person's fingers. As such, analyzing prefrontal cortex activity of a user of vehicle 180 may provide insight into whether or not the user volitionally intended to control vehicle settings and/or functions. Accordingly, in certain embodiments, at least one physiological sensor 175 may be deployed in vehicle 180 to measure physiological signal data for a user operating vehicle 180 and generate one or more signals and/or data to transmit to processing device 105 for processing. The physiological signal data may include, at least, information about an activity level of a prefrontal cortex of the user. The at least one physiological sensor 175 may transmit this information to processing device 105 where it may be processed to determine a level of activity of a prefrontal cortex of the user. Further, processing device 105 may predict the probability that the user intends to employ the user command based on the determined level of activity. For example, physiological signal data collected for a user which intends to control vehicle settings, for example, adjust a volume of music playing within vehicle 180 may indicate a high level of prefrontal cortex activity given the user is attempting to make this volume adjustment via finger movement. Based on the high level of prefrontal cortex activity, processing device 105 may predict a higher probability that the user does intend to employ a user command based on finger movement/tapping.

In certain embodiments, the probability that the user intends to employ the user command is based on auditory cortex activity of the user of vehicle 180. As described above, the auditory cortex receives and processes the contents of audio, such as sounds, voices, and/or music. Thus, in certain embodiments, a level of activity of an auditory cortex of a user of vehicle 180 may indicate whether the user is receiving and/or processing audio. High degrees of both receiving and processing audio content may help, for example, to determine whether a user's finger tapping is the result of listening to audio within vehicle 180 or intended by the user to cause some control over vehicle 180. Accordingly, in certain embodiments, at least one physiological sensor 175 may be deployed in vehicle 180 to measure physiological signal data for a user operating vehicle 180 and generate one or more signals and/or data to transmit to processing device 105 for processing. The physiological signal data may include, at least, information about an activity level of an auditory cortex of the user. The at least one physiological sensor 175 may transmit this information to processing device 105 where it may be processed to determine (1) a level of listening activity within the auditory cortex of the user and (2) a level of processing activity within the auditory cortex of the user. Further, processing device 105 may predict the probability that the user intends to employ the user command based on the determined level of listening activity and/or processing activity within the auditory cortex. For example, where the user is determined to be receiving and processing audio to a high degree, it may be assumed that that the user is listening to music within vehicle 180 and is consciously or sub-consciously identifying a beat of the music. As such, this information may suggest that finger tapping detected for the user, even if not in perfect temporal/rhythmic alignment with the music playing within vehicle 180, may be associated with tapping to the music rather than trying to manipulate one or more vehicle controls.

In certain embodiments, the probability that the user intends to employ the user command is based on motor cortex activity of the user of vehicle 180. As described above, the motor cortex is responsible for generating signals to direct the movement of the body. As such, analyzing motor cortex activity of a user of vehicle 180 may provide insight into whether or not the user volitionally intended to control vehicle settings and/or functions when steering device tapping is detected. For example, in some cases, bouncing of vehicle 180 may cause the user's fingers to come in contact (e.g., tap) a steering device while operating the vehicle. In such a case, motor cortex activity of the user may be low (e.g., given the user did not move their fingers to tap the steering device). This motor cortex activity information may be useful in determining that that the user more than likely did not intend to control vehicle settings and/or functions given the user did not move their fingers, and instead, movement of the vehicle caused the user's fingers to come into contact with the steering device.

In certain embodiments, the probability that the user intends to employ the user command is based on behaviors and/or patterns learned for the user over time. In particular, learned behavior and/or patterns for the user may be collected and generated over time to later predict, when one or more of these behaviors and/or patterns are detected, the likelihood that the user intends to control one or more vehicle settings and/or controls. As an illustrative example, over time, based on observing behavior of a particular user of vehicle 180, driver support system 100 may determine that the user when attempting to control an audio volume within vehicle 180, ninety percent of the time will execute two consecutive taps on a steering device of vehicle 180 using their right hand. As such, in cases where two consecutive fingers taps by a right hand of the user are detected by vibration sensors 160, processing device 105 may assume that the user is more likely than not (e.g., probability is equal to 90%) that the user is intended to adjust audio volume within vehicle 180. Such learned behavior and/or patterns may be user-specific. Further, such learned behavior and/or patterns for a particular user may be stored in memory 185 and/or data storage device 130, for example, in a user profile generated for the particular user.

In certain embodiments, driver support system 100 learns which sections (e.g., top, bottom, bottom and left, top and right, etc.) of a steering device a particular user is more likely to use when attempting to control vehicle settings and/or functions, and which sections of the steering device the particular user is more likely to use when not attempting to control vehicle settings and/or functions. For example, driver support system 100 may learn that a user, when attempting to activate a navigation system within vehicle 180, eighty percent of the time will tap a right, bottom section of the steering device. As such, in certain embodiments, a learned behavior for a user is generated based on (1) a first section of a steering device where vibration is detected when the user is attempting to control the settings/functions of a vehicle and/or (2) a second section of the steering device where vibration is detected when the user is not attempting to control the settings of the vehicle.

In certain embodiments, driver support system 100 learns which vibration patterns (e.g., tapping the steering device rim two times in a same location, tapping the steering device rim with a large delay between each tap, tapping the steering device rim quickly and continuously, tapping the steering device rim with one finger, then two fingers, then three fingers, etc.) caused by a user of vehicle 180 the user is more likely to use when attempting to cause control of vehicle 180, and which vibration patterns caused by the user, the user is more likely to use when not attempting to cause control of vehicle 180. As such, in certain embodiments, a learned behavior for a user is generated based on (1) a first pattern of vibration, caused by the user, to a steering when the user is attempting to control the settings of the vehicle and (2) a second pattern of vibration, caused by the user, to the steering when the user is not attempting to control the settings of the vehicle.

In certain embodiments, driver support system 100 learns which music content a particular user may finger tap along to without intending to control one or more vehicle settings and/or functions. For example, driver support system 100 may learn, over time, that a user enjoys jazz music and thus, when jazz music is playing within vehicle 180, the user has a higher percentage of tapping along to the beat of the jazz music as compared to other genres of music. However, the tapping may not be intended by the user to manipulate vehicle control settings. Instead, the user may be leisurely tapping to the beat of the music while driving. As such, driver support system 100 may learn that when jazz music is detected to be playing with vehicle 180 (e.g., via at least one microphone 165), vibration caused by the user with the steering device may not be intended to cause control of vehicle settings and/or functions. As such, in certain embodiments, a learned behavior for a user is generated based on (1) first audio content (e.g., jazz music) detected by at a microphone positioned within the vehicle when the user is attempting to control the settings of the vehicle and (2) second audio content (e.g., other music genres such as rap, rock, country, etc.) detected by the microphone when the user is not attempting to control the settings of the vehicle.

It should be noted that the above-described learned behaviors and/or patterns are only example behaviors and/or patterns that may be learned by driver support system 100. In other words, the above-described learned behaviors and/or patterns are not an exhaustive list, and many other behaviors and/or patterns for a user may be learned by driver support system 100.

In certain embodiments, the probability that the user intends to employ the user command is based on one or more of the factors described above. For example, the probability may be determined based on (1) audio content received from at least one microphone positioned within vehicle 180, (2) image data received from at least one image sensor positioned within vehicle 180, (3) physiological signals for a user of vehicle 180 received from at least one physiological sensor positioned within vehicle 180, and/or (4) the data representing the learned behaviors and/or patterns for the user over time. For example, processing device 105 may determine that a user intends to employ a user command where the (1) the rhythm of finger tapping detected by vibration sensors 160 is not in temporal alignment with a beat of audio being played within vehicle 180 and (2) physiological signals for the user indicate a high level of prefrontal cortex activity for the user (e.g., indicating volitional movement by the user). A confidence level of the probability determined by processing device 105 may be increased where more than one factor is considered by processing device 105 in making the probability determination.

In certain embodiments, a machine learning model, such as machine learning model 155 illustrated in FIG. 1, may be used to generate the probability that the user intends to employ the user command. The machine learning model 155 may use as input data the (1) audio content received from at least one microphone positioned within vehicle 180, (2) image data received from at least one image sensor positioned within vehicle 180, (3) physiological signals for a user of vehicle 180 received from at least one physiological sensor positioned within vehicle 180, and/or (4) the data representing the learned behaviors and/or patterns for the user over time. The machine learning model 155 may generate a prediction indicative of a probability that the user intends to employ a user command (e.g., a specific user command determined operation 304). In certain embodiments, the output generated by the machine learning model 155 is be a percentage between 0 and 100% indicative of the probability that user intends to employ the user command. In certain embodiments, the output generated by the machine learning model 155 is a "class" indicating (1) that the user intends to employ the user command or (2) that the user does not intend to employ the user command. In certain embodiments, the machine learning model 155 may further output a confidence level associated with each output generated by the machine learning models 15. In certain other embodiments, multiple machine learning models 155 may be used to generate the probability.

In certain embodiments, the machine learning model 155 is a neural network. Neural networks generally include a plurality of connected units or nodes called artificial neurons, loosely modeling the neurons in a biological brain. Nodes are generally included in a plurality of connected layers, where nodes of one layer are connected to nodes of another layer, with various parameters governing the relationships between nodes and layers and the operation of the neural network. Each node generally has one or more inputs with associated weights, a net input function, and an activation function. In certain embodiments, the one or more inputs may include (1) audio content captured at a particular time (e.g., when vibration is detected), (2) image data collected at the particular time, (3) physiological signals collected for a user of vehicle 180 at the particular time, and/or (4) behaviors for a user observed at the particular time. Different weights may be applied to one or more of these inputs to output a prediction of the probability that the user intends to control vehicle settings and/or functions. A weight applied to one input may be a different or the same weight applied to another input.

In certain embodiments, machine learning model 155 is trained prior to deployment of machine learning model 155 for use by processing device 105. Training machine learning model 155 is described in detail below with respect to FIG. 4. In certain embodiments, machine learning model 155 uses continuous learning when deployed. In particular, machine learning model 155 may use the data and/or inputs collected and/or provided when deployed to continuously learn and adjust weight of machine learning model 155.

As an illustrative example, when deployed, driver support system 100 may receive vibration information from vibration sensors 160, and in response to receiving the vibration information, automatically transmit a control command to an audio system of vehicle 180 to increase the volume in the vehicle (e.g., without further input from the user indicating that the user intended to adjust the volume). Subsequent to increasing the volume, the user of vehicle 180 may decrease the volume (e.g., essentially undoing the previous volume change/increase). Machine learning model 155 may use this feedback (e.g., re-adjusting the volume) to adjust one or more parameters of machine learning model 155 (e.g., to make the prediction of machine learning model 155 more accurate) and to help prevent further false positives (e.g., predicted outputs that user intended to control a specific setting and/or function when the user did not intend to control such setting and/or function).

In certain embodiments, driver support system 100 receives feedback from a user of vehicle 180. The feedback may be received via user interface hardware 115. The feedback may include information collected directly from users of vehicle 180 about their reactions and/or experience with the automatic control functionality provided by driver support system 100. In certain embodiments, this feedback is used to further train machine learning model 155.

Still referring to FIG. 3, after determining a probability that the user intends to employ the user command via the vibration caused by the user, at operation 308, operations 300 proceed with determining whether the probability is equal to or above a threshold. The threshold may be a percentage that where exceeded (or equal to) indicates that the user does intend to control vehicle settings and/or functions, while on the other hand, if not exceeded, the user does not intend to control vehicle settings and/or functions. For example, where the threshold is set to 65% where the determined probability at operation 306 is 80%, then processing device 105 determines that the user does intend to initiate control via the finger tapping (e.g., 80%>65% threshold). The threshold may be user-specific and/or may be the same for a plurality of users of vehicle 180.

Operations 300 proceed, at operation 310, with selectively transmitting or not transmitting, to a controllable device, a control command corresponding to the user command based on whether the probability is determined to be equal to or above the threshold. In other words, where the probability is determined to be equal to or above the threshold at operation 308, at operation 310, a control command corresponding to the user command may be transmitted to a particular controllable device. The particular controllable device may be a device and/or system that may be used to carry out the user command (e.g., where the user command is to increase volume, the control command may be transmitted to an audio system of vehicle 180). Alternatively, where the probability is determined to be below the threshold at operation 308, at operation 310, a control command corresponding to the user command may not be transmitted to any controllable device. As such, only a probability determined to be above a threshold (e.g., indicating that the user desires to control one or more vehicle settings and/or functions of one or more vehicle systems and/or devices) may trigger the transmission of a control command to a corresponding controllable vehicle system and/or device. Thus, the technology used for controlling vehicle settings and/or functions may be improved thereby providing a better user experience to a user of vehicle 180.

FIG. 4 depicts a flow diagram illustrating example operations 400 for training a machine learning model to predict a user's intent with respect to controlling vehicle settings and/or functions, according to one or more embodiments shown and described herein. As described above, the machine learning model, subsequent to being trained, may be deployed for generating a prediction indicative of a probability that the user intends to employ a particular user command while operating vehicle 180. Operations 400 may be carried out by model training engine 150 to train the machine learning model.

As illustrated, operations 400 begin, at operation 402, with obtaining a plurality of training data instances. In certain embodiments, the training data instances are obtained by model training engine 150 from training data 195 stored in data storage device 130. Each training data instance may include a training input and a training output. The training input is one or more example items of data, such as (1) audio content received from at least one microphone positioned within vehicle 180, (2) image data received from at least one image sensor positioned within vehicle 180, (3) physiological signals for a user of vehicle 180 received from at least one physiological sensor positioned within vehicle 180, and/or (4) the data representing the learned behaviors and/or patterns for the user over time. The training input may be associated with at least one label that is the training output. The label may indicate (1) that the user intended to control vehicle settings and/or functions, or alternatively, (2) that the user did not intend to control vehicle settings and/or functions.

At operation 404, model training engine 150 may select a training data instance from the plurality of training data instances. Model training engine 150 may select the training data instance at random. At operation 406, model training engine 150 identifies a training input and a training output of the training data instance selected at operation 404. For ease of explanation, and not meant to be limiting to this particular example, it may be assumed that the training input includes information indicating that (1) music was playing within vehicle 180, (2) the music playing was jazz music, and (3) a level of prefrontal cortex activity for the user was at an average level. Further, it may be assumed that the training output corresponding to this training input indicates that the user did not intend to control vehicle settings and/or functions (e.g., via finger tapping). At operation 408, model training engine 150 may extract a plurality of features for the training input. Using the provided example, three features may be extracted for the training input (e.g., (1) indication that music was playing, (2) type of music genre, and (3) the level of prefrontal cortex activity).

Operations 400 then proceed, to operation 410, where the plurality of features for the training input are provided to an input layer of the machine learning model. At operation 412, operations 400 proceed with receiving output from the machine learning model in response to the plurality of features. In certain embodiments, model training engine 150 receives an inference as an output from the machine learning model. The inference may be output by the final layer or output layer of the machine learning model. The inference may be a predicted probability that the user intends to employ a user command via vibration caused by the user. Using the previous example, the probability predicted by the machine learning model may be equal to 40% (e.g., 40% likely that the user intended to employ a user command via the vibration).

At operation 414, model training engine 150 determines whether the probability is above a threshold to determine an action, wherein the action comprises (1) transmitting a control command (e.g., user intends to control vehicle settings and/or functions) or (2) not transmitting a control command (e.g., user does not intend to control vehicle settings and/or functions). The threshold used here may be the same threshold used at operation 308 in operations 300 illustrated in FIG. 3. Although not meant to be limiting to this particular example, it may be assumed that the threshold is equal to 65%. Thus, at operation 414, model training engine 150 determines that the predicted probability of 40% is less than 65%. Accordingly, the action comprises not transmitting a control command.

Operations 400 then proceed, to operation 416, to evaluate a similarity of the action to the training output. In this example, not transmitting a control command corresponds to predicting that the use does not intent to control vehicle settings and/or functions via the detected finger tapping. This output is compared to the training output for the training data instance indicating that the user does not intend to control vehicle settings and/or functions. In this example, the training output matches the prediction made by the machine learning model.

In certain embodiments, evaluating the similarity of the output generated by the model is performed using a loss function. In certain embodiments, the predicted probability is compared to a probability defined for the training output, where the probability exists.

At operation 418, model training engine 150 determines whether to modify one or more parameters of the machine learning model based on the similarity determined at operation 416. In certain embodiments, model training engine 150 trains the machine learning model by iteratively modifying parameters of the machine learning model until its output in response to the training input matches the training output. For example, the output may be compared to the training output (e.g., at operation 416), and various parameters such as weights, connections, number of hidden nodes, weight decay, activation sparsity, nonlinearity, weight initialization, random seeds, model averaging, preprocessing input data, coordinate descent, grid search, random search, and model-based optimization methods, may be modified such until the output matches the training output.

In certain embodiments, operations 400 are performed for a plurality of training data instances in order to train the machine learning model. For example, at operation 420, operations 400 proceed with determining whether all of the plurality of training data instances have been used to train the machine learning model. Where all of the plurality of training data instances have been used to train the machine learning model, operations 400 are complete and the machine learning model may be deployed for use. On the other hand, where all of the plurality of training data instances have not yet been used to train the machine learning model, operations 400 proceed back to operation 404 to select another training data instance for training the machine learning model.

Optionally, in certain embodiments, where all of the plurality of training data instances have not yet been used to train the machine learning model, operations 400 proceed to operation 422 where model training engine 150 determines whether a confidence level has been achieved. In particular, a confidence score that represents the likelihood that the output of the machine learning model is correct and will provide an accurate probability prediction is calculated. This confidence level may be calculated based on the similarity of the output to the training output. Where the confidence level is above a threshold confidence level (e.g., predetermined and/or selected by a user), training of the machine learning model may be complete. As such, where the confidence level is achieved, operations 400 are complete. Alternatively, where the confidence level has not been achieved, operations 400 proceed back to operation 404 to select another training data instance for further training the machine learning model.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" or "certain" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for controlling settings of a vehicle via steering device finger tapping, the method comprising:
    receiving audio content from at least one microphone positioned within the vehicle;
    receiving vibration information from a plurality of vibration sensors associated with a steering device, wherein the plurality of vibration sensors are configured to detect vibration on the steering device caused by a user of the vehicle;
    in response to receiving the vibration information, determining a user command based on the vibration information;
    determining a probability that the user intends to employ the user command via the vibration caused by the user by:
        determining a beat of the audio content;
        determining a rhythm of the vibration information; and
        determining a percentage of temporal alignment between the beat of the audio content and the rhythm of the vibration information, wherein the probability that the user intends to employ the user command is based on the percentage;
    determining whether the probability is equal to or above a threshold; and
    selectively transmitting or not transmitting, to a controllable device, a control command corresponding to the user command based on whether the probability is determined to be equal to or above the threshold, wherein the control command actuates the controllable device.

2. The method of claim 1, wherein the audio content comprises music content.

3. The method of claim 1, further comprising:
    receiving image data via at least one image sensor positioned within the vehicle, wherein the image data captures one or more fingers of the user; and
    when the vibration information is received by the plurality of vibration sensors, processing the image data to determine a posture of the one or more fingers of the user,
    wherein determining the probability that the user intends to employ the user command via the vibration caused by the user comprises:
        predicting, using a machine learning model, the probability that the user intends to employ the user command based on the percentage and the posture of the one or more fingers of the user, wherein the machine learning model is trained to differentiate between first finger postures of the user that are intended to control the settings of the vehicle and second finger postures of the user that are not intended to control the settings of the vehicle.

4. The method of claim 3, wherein the posture of the one or more fingers comprises at least one of:
    a position of each of the one or more fingers in relation to each other; or
    a bend of each of the one or more fingers in relation to each other.

5. The method of claim 1, wherein determining the probability that the user intends to employ the user command via the vibration caused by the user further comprises:
    accessing data representing learned behavior for the user over time; and
    determining the probability that the user intends to employ the user command via the vibration based on the learned behavior.

6. The method of claim 5, wherein the learned behavior is generated based on one or more of:
    a first section of the steering device where the vibration is detected when the user is attempting to control the settings of the vehicle;
    a second section of the steering device where the vibration is detected when the user is not attempting to control the settings of the vehicle;
    a first pattern of vibration, caused by the user, to the steering device when the user is attempting to control the settings of the vehicle;
    a second pattern of vibration, caused by the user, to the steering device when the user is not attempting to control the settings of the vehicle;
    first audio content detected by at least one microphone positioned within the vehicle when the user is attempting to control the settings of the vehicle; and
    second audio content detected by the at least one microphone positioned within the vehicle when the user is not attempting to control the settings of the vehicle.

7. The method of claim 1, further comprising:
    receiving one or more of:
        image data via at least one image sensor positioned within the vehicle, wherein the image data captures one or more fingers of the user;
        physiological signals for the user via at least one physiological sensor positioned within the vehicle; and
        data representing learned behavior for the user over time,
    wherein determining the probability that the user intends to employ the user command via the vibration caused by the user further comprises determining the probability using a machine learning model and one or more of the audio content, the image data, the physiological signals, and the data representing the learned behavior for the user over time.

8. The method of claim 7, wherein the machine learning model is trained according to a classifier algorithm to predict whether the user intends to employ a user command via vibration, caused by the user, with the steering device.

9. The method of claim 7, wherein the machine learning model takes part in continuous learning based on:
    feedback received via a driver feedback system; or
    actions taken by the user subsequent to selectively transmitting or not transmitting, to the controllable device, the control command.

10. The method of claim 1, wherein:
    the plurality of vibration sensors are positioned so that vibration from each different section of the steering device produces a unique combination of vibration information;

each unique combination of the vibration information produced from vibration at each different section of the steering device corresponds to a unique user command; and determining the user command based on the vibration information comprises determining the unique user command corresponding to the vibration information received from the plurality of vibration sensors.

11. The method of claim 1, wherein:

unique patterns of the vibration with the steering device correspond to unique user commands; and the method further comprises:

processing the vibration information to identify a pattern of the vibration, caused by the user, wherein determining the user command based on the vibration information comprises determining a unique user command corresponding to the pattern of the vibration.

12. The method of claim 1, wherein the user command comprises one or more of: select a next song or a next channel, select a previous song or a previous channel, fast forward, rewind, volume up or down, mute/unmute, answer phone call/end call, select audio source, change temperature up or down, change air conditioner or heat blowing location, activate or deactivate navigation, select navigation target, show current location, turn on GPS to the navigation target, turn on or off spoken feedback, switch on or off traffic announcements, or switch on or off lane assist mechanisms.

13. A system for controlling settings of a vehicle via steering device finger tapping, the system comprising:
a controllable device;
at least one microphone that receives audio content;
a plurality of vibration sensors associated with a steering device, wherein the plurality of vibration sensors are configured to detect vibration on the steering device caused by a user of the vehicle;
one or more processors; and
at least one memory, the one or more processors and the at least one memory configured to:
receive vibration information from the plurality of vibration sensors;
in response to receiving the vibration information, determine a user command based on the vibration information;
determine a probability that the user intends to employ the user command via the vibration caused by the user by:
determining a beat of the audio content;
determining a rhythm of the vibration information; and
determining a percentage of temporal alignment between the beat of the audio content and the rhythm of the vibration information, wherein the probability that the user intends to employ the user command is based on the percentage;
determine whether the probability is equal to or above a threshold; and
selectively transmit or not transmit, to the controllable device, a control command corresponding to the user command based on whether the probability is determined to be equal to or above the threshold, wherein the control command physically actuates the controllable device.

14. The system of claim 13, wherein:
the system further comprises:
at least one image sensor positioned within the vehicle; and
at least one physiological sensor positioned within the vehicle,
the one or more processors and the at least one memory are further configured to:
receive one or more of:
image data via from the at least one image sensor, wherein the image data captures one or more fingers of the user;
physiological signals for the user from the least one physiological sensor; and
data representing learned behavior for the user over time,
wherein to determine the probability that the user intends to employ the user command via the vibration caused by the user further comprises to determine the probability using a machine learning model and one or more of the audio content, the image data, the physiological signals, and the data representing the learned behavior for the user over time.

15. The system of claim 14, wherein the machine learning model is trained according to a classifier algorithm to predict whether the user intends to employ a user command via vibration, caused by the user, with the steering device.

16. The system of claim 13, wherein:
the plurality of vibration sensors are positioned so that vibration from each different section of the steering device produces a unique combination of vibration information;
each unique combination of the vibration information produced from vibration at each different section of the steering device corresponds to a unique user command; and
determining the user command based on the vibration information comprises determining the unique user command corresponding to the vibration information received from the plurality of vibration sensors.

17. The system of claim 13, wherein:
unique patterns of the vibration with the steering device correspond to unique user commands; and
the method further comprises:
processing the vibration information to identify a pattern of the vibration, caused by the user,
wherein determining the user command based on the vibration information comprises determining a unique user command corresponding to the pattern of the vibration.

18. A method for controlling settings of a vehicle via steering device finger tapping, the method comprising:
receiving physiological signals for the user via at least one physiological sensor positioned within the vehicle; and
when the vibration information is received by the plurality of vibration sensors, processing the physiological signals to determine:
a level of listening activity within an auditory cortex of the user, and
a level of processing activity within the auditory cortex of the user,
receiving vibration information from a plurality of vibration sensors associated with a steering device, wherein the plurality of vibration sensors are configured to detect vibration on the steering device caused by a user of the vehicle;
in response to receiving the vibration information, determining a user command based on the vibration information;

determining a probability that the user intends to employ the user command via the vibration caused by the user based on at least one of the level of listening activity or the level of processing activity within the auditory cortex of the user;

determining whether the probability is equal to or above a threshold; and selectively transmitting or not transmitting, to a controllable device, a control command corresponding to the user command based on whether the probability is determined to be equal to or above the threshold, wherein the control command physically actuates the controllable device.

19. The system of claim 18, wherein:

the plurality of vibration sensors are positioned so that vibration from each different section of the steering device produces a unique combination of vibration information;

each unique combination of the vibration information produced from vibration at each different section of the steering device corresponds to a unique user command; and determining the user command based on the vibration information comprises determining the unique user command corresponding to the vibration information received from the plurality of vibration sensors.

20. The system of claim 18, wherein:

unique patterns of the vibration with the steering device correspond to unique user commands; and the method further comprises:

processing the vibration information to identify a pattern of the vibration, caused by the user, wherein determining the user command based on the vibration information comprises determining a unique user command corresponding to the pattern of the vibration.

* * * * *